United States Patent [19]

Hohmann et al.

[11] Patent Number: 5,309,607
[45] Date of Patent: May 10, 1994

[54] HOSE CLIP

[75] Inventors: Ralf Hohmann, Bruchköbel; Bernd Kleinhens, Geinhausen; Manfred Krüger, Büdingen; Stephan Mann, Bieber; Erich Ruf, Frankfurt; Ralf Spors, Bruchköbel; Reiner Schreiter; Willi Stichel, both of Maintal; Gerhard Wachter, Büdingen; Gerhard Winterstein, Bad Vilbel; Siegmund Zeidler, Hanau, all of Fed. Rep. of Germany

[73] Assignee: Rasmussen GmbH, Maintal, Fed. Rep. of Germany

[21] Appl. No.: 922,053

[22] Filed: Jul. 29, 1992

[30] Foreign Application Priority Data

Aug. 16, 1991 [DE] Fed. Rep. of Germany ....... 4127017

[51] Int. Cl.$^5$ ............................................. B65D 63/00
[52] U.S. Cl. .............................. 24/274 R; 24/20 CW; 24/20 LS
[58] Field of Search ............... 24/274 R, 271, 278, 24/279, 20 R, 20 LS, 20 W, 20 CW, 20 TT; 285/253

[56] References Cited

U.S. PATENT DOCUMENTS

| 554,808 | 2/1896 | Weaver | 24/20 LS |
|---|---|---|---|
| 3,426,401 | 2/1969 | Denyes | 24/274 R |
| 3,950,830 | 4/1976 | Duprez | 24/274 R |
| 4,308,648 | 1/1982 | Fay | 24/274 R |
| 4,523,352 | 6/1985 | Wachter | 24/274 R |
| 4,993,124 | 2/1991 | Ouimet | 24/274 R |
| 5,111,555 | 5/1992 | Oetiker | 24/20 CW |
| 5,115,541 | 5/1992 | Stichel | 24/20 R |

Primary Examiner—Victor N. Sakran
Attorney, Agent, or Firm—Darby & Darby

[57] ABSTRACT

A hose clip which comprises a flexible strap adapted to be placed around a selected portion of a hose and to be tightened around such selected portion by turning a bolt or screw. An elongated concavo-convex strip-shaped resilient insert is adjacent a portion of the internal surface and extends in the circumferential direction of the strap opposite the mechanism which serves to increase or reduce the effective length of the strap. The convex external surface of the insert is biased in a direction away from the adjacent portion of the internal surface of the strap by one or more springs which are disposed between the insert and the strap and are of one piece with the insert. At least one end of the insert is slidable along the strap. The spring or springs ensure that the strap does not become loose as a result of aging of the material of the adjacent portion of the hose.

16 Claims, 3 Drawing Sheets

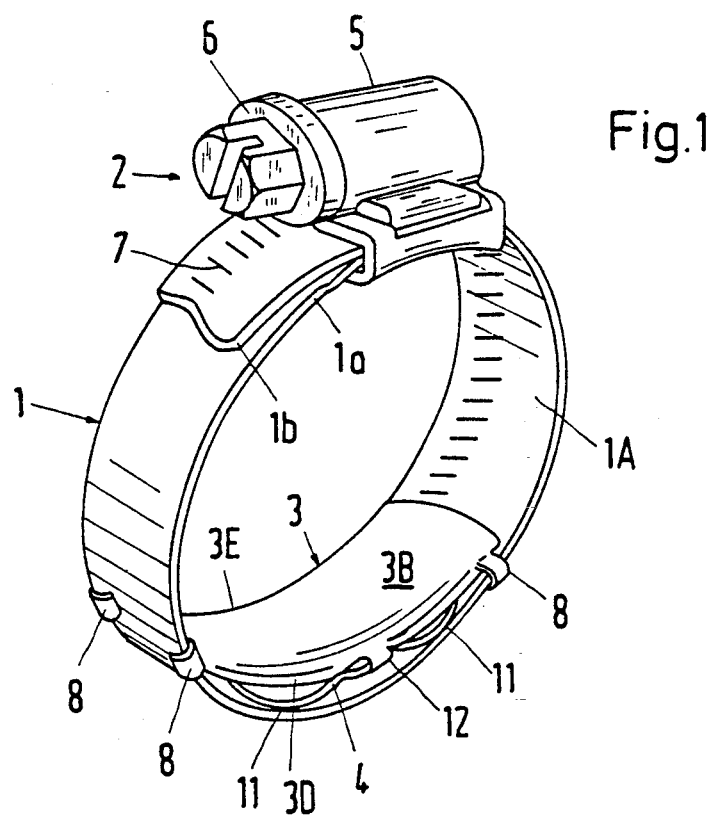
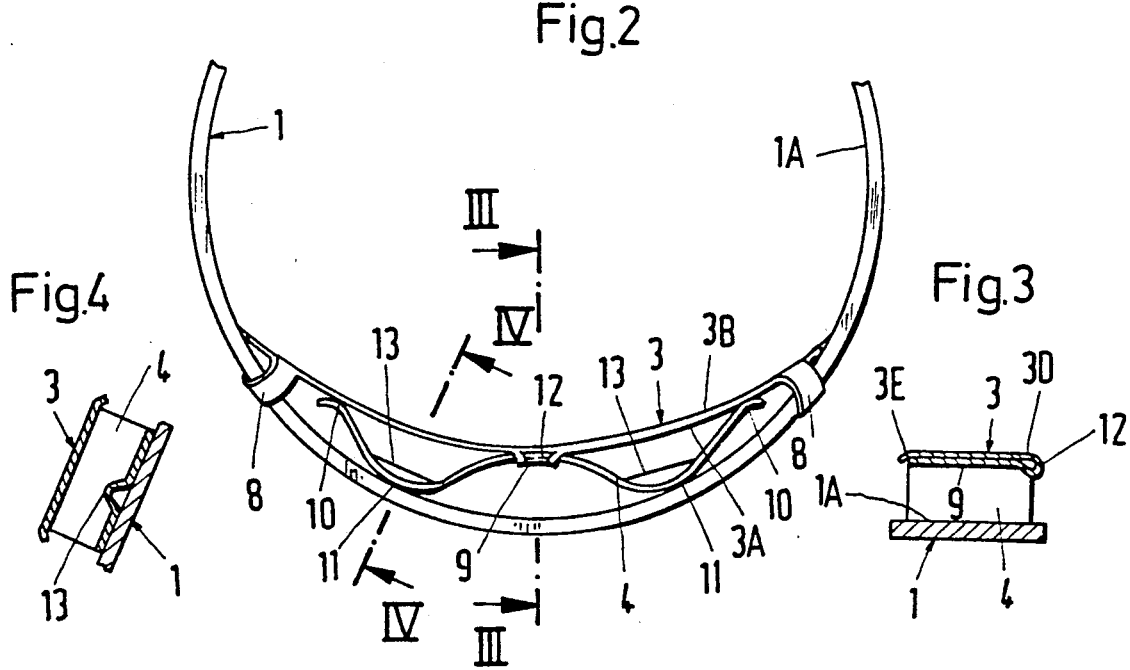

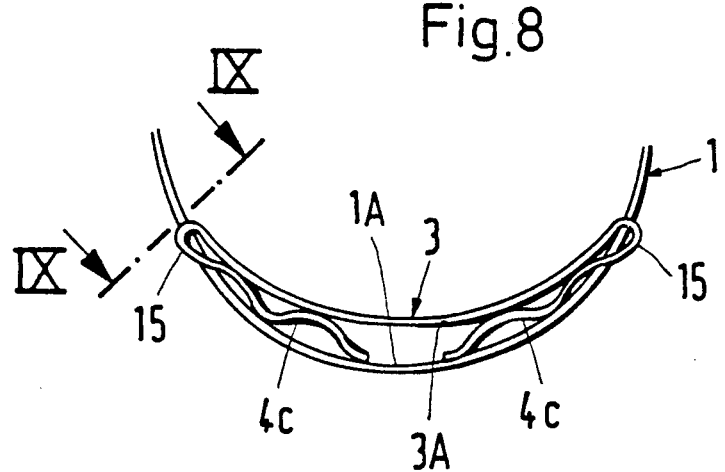
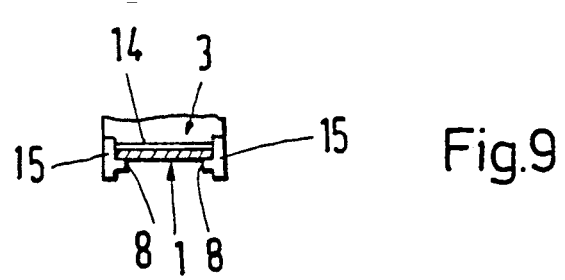
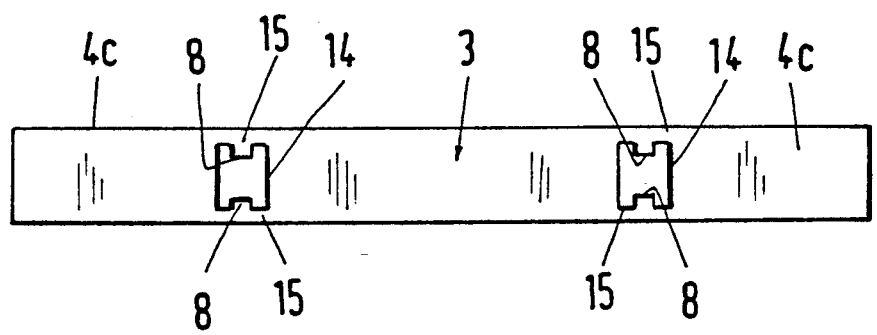

HOSE CLIP

BACKGROUND OF THE INVENTION

The invention relates to hose clips in general, and more particularly to improvements in hose clips of the type disclosed in commonly owned U.S. Pat. No. 5,115,541 granted May 26, 1992 to Stichel for "Hose clip".

The patent to Stichel discloses a hose clip wherein an elongated flexible strap can be placed around a selected portion of a hose (e.g., around that portion of a hose which surrounds a nipple) to be thereupon tightened around the hose in order to establish a sealing connection between the hose and the part which is received in the confined portion of the hose. An arcuate insert is installed between a portion of the internal surface of the strap and the adjacent portion of the external surface of the hose, and such insert is biased against the hose by one or more discrete springs which react against the internal surface of the strap and bear against the external surface of the insert. This ensures that the spring or springs can compensate for aging of the material of the hose, i.e., that the seal between the hose and a nipple or the like remains intact for extended periods of time. One end of the insert can be affixed to and the other end of the insert is slidable along and in the circumferential direction of the strap. The curvature of the internal surface of the insert equals or approximates the curvature of the non-overlapped portion of the internal surface of the strap. The flexibility of the insert preferably matches or approximates the flexibility of the strap.

The spring or springs which operate between the insert and the strap are separately produced parts which must be assembled with the insert or with the strap before the insert is positioned adjacent a selected portion of the internal surface of the strap. This contributes to the manufacturing cost as well as to assembly cost of the hose clip. In addition, it is necessary to maintain in storage large numbers of spare springs, either of a single type or of two or more different types.

OBJECTS OF THE INVENTION

An object of the invention is to provide a hose clip which is simpler and less expensive than heretofore known hose clips.

Another object of the invention is to provide a hose clip which constitutes an improvement over and a further development of the hose clip described, shown and claimed in commonly owned U.S. Pat. No. 5,115,541.

A further object of the invention is to provide novel and improved means for biasing the insert of the hose clip away from the adjacent portion of the strap.

An additional object of the invention is to provide a novel and improved combination of an insert and one or more springs for use in the above outlined hose clip.

Still another object of the invention is to provide a novel and improved combination of an insert and a strap for use in the above outlined hose clip.

A further object of the invention is to provide a novel and improved method of biasing the insert relative to the strap in a hose clip of the above outlined character.

Another object of the invention is to provide a hose clip which can be applied to hoses by resorting to automatic machinery.

An additional object of the invention is to provide a hose clip which comprises fewer parts than heretofore known hose clips serving the same or a similar purpose.

Still another object of the invention is to provide a novel and improved combination of hose and hose clip.

A further object of the invention is to provide a hose clip which can be assembled for application around a selected portion of a hose in a novel and improved way.

An additional object of the invention is to provide a novel and improved method of preventing separation of the spring or springs from other parts of a hose clip of the type described in commonly owned U.S. Pat. No. 5,115,541.

Another object of the invention is to provide a hose clip which exhibits all features and advantages of heretofore known hose clips even though it comprises a smaller number of discrete parts.

SUMMARY OF THE INVENTION

The invention is embodied in a hose clip which comprises a substantially annular deformable strap having an internal surface, and an elongated insert having an external surface adjacent and extending along a portion of the internal surface. The insert includes a first end and a second end, and at least one of these ends is movable along and circumferentially of the strap. The improved hose clip further comprises means for biasing the external surface of the insert away from the aforementioned portion of the internal surface of the strap. In accordance with a feature of the invention, the biasing means is integral (e.g., of one piece) with the insert. Thus, the improved hose clip comprises a relatively small number of parts merely including the strap, the insert with the biasing means, and means for increasing or reducing the effective size of the strap around a selected portion of a hose.

The biasing means can comprise at least one undulate leaf spring which is interposed between the two surfaces. Such spring can be elongated to thus comprise two spaced apart end portions and a corrugation between the two end portions. The insert can constitute a concavo-convex strip of resilient metallic or plastic material with two marginal portions extending circumferentially of the strap. The corrugation can be integral with one marginal portion of the insert. The arrangement may be such that the apex of the corrugation is of one piece with the one marginal portion of the insert.

In accordance with another presently preferred embodiment of the improved hose clip, the biasing means comprises an undulate spring which is of one piece with the first end of the insert and is disposed between the two surfaces. The first end of the insert can include a loop which connects the spring with the insert, and such loop can be provided with an opening for the strap. The loop can further comprise projections which overlie the marginal portions of the strap at the opening. The biasing means of such hose clip can comprise first and second undulate springs which are of one piece with the first and second ends of the insert, respectively, and are disposed between the two surfaces.

If the biasing means comprises at least one leaf spring between the two surfaces, such leaf spring can be provided with at least one corrugation including an apex at the internal surface of the strap. The spring can further comprise means for reinforcing the at least one corrugation, at least in the region of the aforementioned apex. The reinforcing means can comprise at least one rib which extends circumferentially of the strap.

In accordance with another presently preferred embodiment, the biasing means can comprise a plurality of leaf springs each having a first end portion of one piece with one marginal portion of the insert and a second end portion at the internal surface of the strap. Alternatively, the biasing means can comprise at least one leaf spring which is disposed between the two surfaces. The spring has a first end portion which is of one piece with one marginal portion of the insert, an intermediate portion which reacts against the aforementioned portion of the internal surface of the strap, and a second end portion which bears against the external surface of the insert.

In accordance with still another embodiment of the present invention, the biasing means comprises a plurality of leaf springs each of one piece with one marginal portion of the insert and each disposed between the two surfaces. The leaf springs include a first leaf spring which is distant from one end of the insert, and at least one additional spring between the first spring and the one end of the insert. The length of the first spring (as seen in the circumferential direction of the strap) can exceed the length of the at least one additional spring. Alternatively or in addition to such dimensioning of the springs, the first spring can extend a first distance from one marginal portion toward the other marginal portion of the insert, and the at least one additional spring can extend a lesser second distance from one marginal portion toward the other marginal portion of the insert.

All in all, the biasing means can comprise at least one spring at least a portion of which is disposed between the two surfaces. The at least one spring can be corrugated in the circumferential direction or axially of the strap.

The manner in which the effective length of the strap can be increased or reduced is or can be the same as described and shown in the aforementioned commonly owned U.S. Pat. No. 5,115,541.

The novel features which are considered as characteristic of the invention are set forth in particular in the appended claims. The improved hose clip itself, however, both as to its construction and the mode of utilizing the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a perspective view of a hose clip which embodies one form of the invention and wherein the means for biasing the insert comprises a single spring;

FIG. 2 is an enlarged fragmentary elevational view of the hose clip which is shown in FIG. 1;

FIG. 3 is a transverse sectional view substantially as seen in the direction of arrows from the line III—III in FIG. 2;

FIG. 4 is a transverse sectional view substantially as seen in the direction of arrows from the line IV—IV in FIG. 2;

FIG. 8 is a fragmentary elevational view of a fourth hose clip wherein the biasing means comprises two undulate springs which are of one piece with the two ends of the insert;

FIG. 9 is a transverse sectional view substantially as seen in the direction of arrows from the line IX—IX of FIG. 8; and FIG. 10 is a plan view of a blank which can be converted into an insert and two springs of the type shown in FIG. 8.

DESCRIPTION OF PREFERRED EMBODIMENTS

Figure 5:
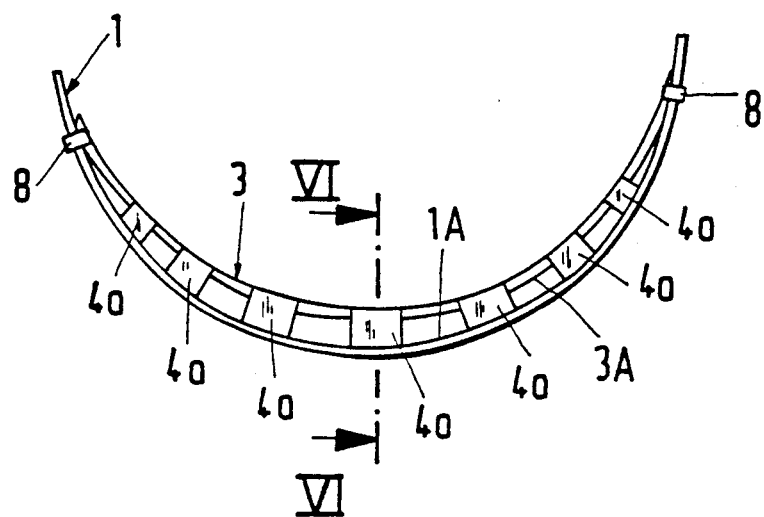
FIG. 5 is a fragmentary elevational view of a second hose clip wherein the means for biasing the insert away from the internal surface of the strap comprises a plurality of springs.

FIGS. 1 to 4 illustrate a hose clip which comprises an elongated flexible strap 1, a mechanism 2 for increasing or reducing the effective length of the strap 1, an elongated concavo-convex insert 3 having a convex external surface 3A confronting the adjacent portion of the internal surface 1A of the strap 1, and an elongated undulate leaf spring 4 which reacts against a concave internal surface 1A of the strap 1 and bears against the surface 3A to bias the insert against a portion of a hose (not shown) which is surrounded by the strap. In accordance with a feature of the invention, the spring 4 is of one piece with the insert 3.

The mechanism 2 comprises a casing 5 which is affixed to one end 1a of the strap 1 and contains a rotary screw or bolt 6 having external threads mating with adjacent teeth 7 of the other end 1b of the strap. The other end 1b overlies the end 1a and extends through the casing 5. By rotating the bolt 6 in a clockwise or in a counterclockwise direction, an operator or an automaton can tighten or loosen the strap 1 and the insert 3 around a selected portion of a hose, e.g., a portion which confines a nipple or an end portion of a pipe. The hose is normally made of an elastomeric material which exhibits a tendency to age with time, and the purpose of the spring 4 is to compensate for such aging by ensuring that the force with which the concave internal surface 3B of the insert 3 and the non-overlapped portion of the internal surface 1A of the strap 1 bear against the hose remains at least substantially unchanged.

The insert 3 is located substantially diametrically opposite the casing 5 and its external surface 3A overlies less than one-half of the internal surface 1A of the strap 1, preferably a little more than 25 percent of the surface 1A. The two ends of the insert 3 are provided with outwardly bent projections in the form of claws 8 which overlie, with a certain amount of play, the external surfaces of the respective marginal portions of the strap 1 so that the strap can slide relative to the insert and/or vice versa but the ends of the insert are held rather close to the internal surface 1A. It is also possible to design at least one pair of claws 8 in such a way that the marginal portions of the strap 1 can be caused to snap between them.

The curvature of the internal surface 3B of the insert preferably equals or approximates the curvature of the non-overlapped portion of the internal surface 1A of the strap 1, at least when the strap is tightened around a selected portion of a hose. Furthermore, the flexibility of the insert 3 can match or can at least approximate the flexibility of the strap 1.

The leaf spring 4 has two mirror symmetrical halves and each of these halves comprises a corrugation 11 whose apex reacts against the internal surface 1A of the strap 1. The end portions 10 of the spring 4 are caused to bear against the external surface 3A of the insert 3, and the median portion of the spring 4 constitutes a third corrugation 9 whose apex is of one piece with the respective marginal portion 3D of the insert. The end portions 10 of the spring 4 slide along the external surface 3A of the insert 3 when the spring is deformed as a result of movement of the insert 3 toward the overlapped portion of the internal surface 1A of the strap 1 or when the spring is free to reassume its unstressed or less stressed condition in response to manipulation of the mechanism 2 in a sense to increase the effective length of the strap 1. The connection 12 between the marginal portion 3D of the insert 3 and the spring 4 is a loop (see particularly FIG. 3) which maintains the apex of the median corrugation 9 in contact with the external surface 3A.

The apices of the corrugations 11 are reinforced by ribs 13 which extend in the circumferential direction of the strap 1. The ribs 13 are provided at those sides of the corrugations 11 which confront the external surface 3A of the insert 3.

An advantage of the novel combination of insert 3 and spring 4 is that it contributes to lower cost of the improved clip and simplifies the application of the clip around a selected portion of a hose. The spring 4 cannot be lost or misplaced and is invariably maintained in an optimum position relative to the strap 1 as soon as the strap is properly assembled with the insert, i.e., as soon as the projections 8 overlie the adjacent parts of the respective marginal portions of the strap. A blank which is to be converted into the insert 3 and spring 4 can be made of suitable springy metallic sheet material. The blank is thereupon deformed by forming the loop 12 so that the spring 4 is located adjacent the convex external surface 3A of the insert 3. The making of the spring 4 of one piece with the insert 3 also simplifies the manipulation of the parts 3, 4 in storage, during transport as well as during assembly with a strap 1. The dimensions and/or other characteristics of the reinforcing ribs 13 can be readily selected in such a way that the finished spring 4 will exhibit an optimal resistance to deformation when the clip embodying the insert 3 and its spring 4 is in actual use.

An advantage of the structure which is shown in FIGS. 1 to 4 is that the resiliency of the spring 4 is not affected by the nature of its connection (at 12) to the respective marginal portion 3D of the insert 3. The other marginal portion of the insert 3 is shown at 3E.

Figure 6:
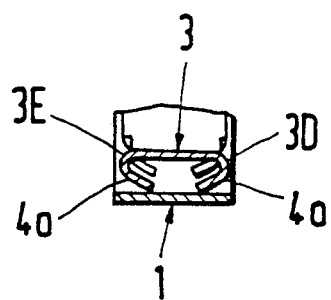
FIG. 6 is a transverse sectional view substantially as seen in the direction of arrows from the line VI—VI of FIG. 5.

FIGS. 5 and 6 illustrate a portion of a second hose clip wherein the biasing means comprises pairs of confronting relatively small leaf springs 4a which are of one piece with the respective marginal portions 3D, 3E of the insert 3. Each spring 4a comprises a first end portion which is of one piece with the respective marginal portion of the insert 3, and a second end portion which bears against the internal surface 1A of the strap 1. The length of the springs 4a (as measured in the circumferential direction of the strap 1) can decrease in directions from the center of the insert 3 toward the ends, i.e., toward the respective pairs of projections 8. Furthermore, the width of the springs 4a (as measured in a direction from the marginal portion 3D toward the marginal portion 3E or in the opposite direction) can also decrease in a direction from the center toward the two ends of the insert 3. In this manner, the maker of the combination of insert 3 and springs 4a can select the bias of selected parts of the composite spring between the external surface 3A and the internal surface 1A.

The manner in which the effective length of the strap 1 of FIGS. 5 and 6 can be increased or reduced is or can be the same as described with reference to FIG. 1.

Figure 7:
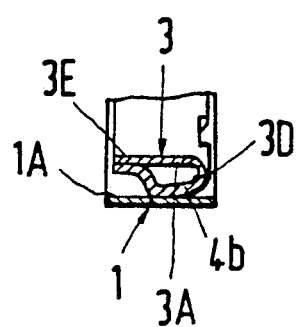
FIG. 7 is a transverse sectional view similar to that of FIG. 6 but showing a portion of a third hose clip.

FIG. 7 shows a portion of a hose clip which constitutes a modification of the hose clip of FIGS. 5 and 6. Though FIG. 7 shows only one leaf spring 4b, the biasing means can comprise a number of such springs, e.g., half the number of springs 4a in the hose clip of FIGS. 5 and 6. One end of the illustrated spring 4b is of one piece with the marginal portion 3D of the insert 3 and its other end abuts the external surface 3A at the other marginal portion 3E. An intermediate portion of the spring 4b reacts against the internal surface 1A of the strap 1. The clip of FIG. 7 can comprise only a single set of springs 4b all of which are of one piece with the marginal portion 3D of the insert 3. Alternatively, the clip can comprise two sets of springs 4b, one set made of one piece with the marginal portion 3D and the other set made of one piece with the marginal portion 3E. The springs 4b of the two sets are then staggered relative to each other in the circumferential direction of the strap 1. The length and/or the width of the springs 4b can increase in the circumferential and axial directions of the strap 1, the same as described with reference to the springs 4a in the clip of FIGS. 5 and 6.

The hose clips of FIGS. 5-6 and FIG. 7 exhibit the advantage that the resiliency of the composite spring including the springs 4b or 4c can be selected with a high degree of accuracy. Thus, each of these springs can be dimensioned and shaped to ensure that the adjacent portion of the insert 3 is biased against the hose with an accurately selected force. The provision of several discrete springs 4b or 4c renders it possible to conform the bias of various portions of the composite spring to the width of the clearance between the corresponding portions of the surfaces 1A and 3A.

FIGS. 8 to 10 illustrate a portion of a fourth hose clip wherein the biasing means comprises two undulate springs 4c each of which is of one piece with a different end of the insert 3. One of the springs 4c can be omitted without departing from the spirit of the invention, especially if the remaining spring 4c is made longer so that it extends at least substantially all the way between the two ends of the insert. The loops 15 which establish integral connections between the springs 4c and the respective ends of the insert 3 have openings 14 for the adjacent portions of the strap 1. Furthermore, the loops 15 are provided with projections 8 which overlie the strap portions in the respective openings 14 to thus ensure that the insert 3 is adequately guided by the strap 1. The width of the openings 14 is selected with a view to ensure that the insert 3 is properly guided against excessive lateral movements (in the axial direction of the strap 1) but is free to move in the circumferential direction of the strap. The apices of certain corrugations of the springs 4c react against the internal surface 1A of the strap 1, and the apices of the other corrugations bear against the external surface 3A of the insert 3.

The structure of FIGS. 8 and 10 exhibits the advantages of the hose clip of FIGS. 1 to 4. Thus, the flexibility of the springs 4c is not affected by the nature of their connections (at 15) with the insert 3. Furthermore, the blank of FIG. 10 can be shaped in such a way that it is immediately provided with the openings 14 and projections 15 to thus ensure optimal guidance of the strap 1 and insert 3 relative to each other in the circumferential and axial directions of the strap.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A hose clip comprising a substantially annular deformable strap having an internal surface; an elongated insert having an external surface adjacent and extending along a portion of said internal surface circumferentially of said strap, said insert having a first end and a second end and at least one of said ends being movable along and circumferentially of said strap; and means for biasing said external surface away from said portion of said internal surface, said biasing means being integral with said insert and comprising at least one undulate leaf spring which is interposed between said surfaces, said leaf spring being elongated and comprising two spaced apart end portions and a corrugation between said end portions, said insert having first and second marginal portions and said corrugation being integral with one of said marginal portions.

2. The hose clip of claim 1, wherein said biasing means is of one piece with said insert.

3. The hose clip of claim 1, wherein said corrugation has an apex of one piece with said one marginal portion.

4. The hose clip of claim 1, wherein said biasing means comprises an undulate spring which is of one piece with said first end of said insert and is disposed between said surfaces.

5. The hose clip of claim 4, wherein said first end includes a loop which connects said spring with said insert and said loop has an opening for said strap.

6. The hose clip of claim 1, wherein said corrugation includes an apex at said internal surface, said spring further having means for reinforcing said corrugation, at least in the region of said apex.

7. The hose clip of claim 6, wherein said reinforcing means comprises at least one rib extending circumferentially of said strap.

8. The hose clip of claim 1, wherein said biasing means comprises at least one spring at least a portion of which is disposed between said surfaces, said at least one spring being corrugated in one of two directions including axially and circumferentially of said strap.

9. A hose clip comprising a substantially annular deformable strap having an internal surface; an elongated insert having an external surface adjacent and extending along a portion of said internal surface circumferentially of said strap, said insert having a first end and a second end and at least one of said ends being movable along and circumferentially of said strap; and means for biasing said external surface away from said portion of said internal surface, said biasing means being integral with said insert and comprising an undulate spring which is of one piece with said first end of said insert and is disposed between said surfaces, said first end including a loop which connects said spring with said insert, said loop having an opening for receiving said strap therein, said strap having two spaced-apart elongated marginal portions, and said opening having edges adjacent said marginal portions of said strap, at least one of said edges having a projection overlying the adjacent one of said marginal portions of said strap.

10. The hose clip of claim 9, wherein said biasing means comprises first and second undulate springs which are of one piece with the respective ends of said insert and are disposed between said surfaces.

11. The hose clip of claim 9, wherein each of said edges of said opening defines a projection, each of said projections extending toward the opposite one of said edges of said opening.

12. The hose clip of claim 11, wherein each of said projections overlie the adjacent one of said marginal portions of said strap.

13. A hose clip comprising a substantially annular deformable strap having an internal surface; an elongated insert having an external surface adjacent and extending along a portion of said internal surface circumferentially of said strap, said insert having a first end and a second end and at least one of said ends being movable along and circumferentially of said strap; and means for biasing said external surface away from said portion of said internal surface, said biasing means being integral with said insert, said insert having elongated marginal portions extending circumferentially of said strap and said biasing means comprising a plurality of leaf springs each having a first end portion of one piece with one of said marginal portions and a second end portion at said internal surface.

14. A hose clip comprising a substantially annular deformable strap having an internal surface; an elongated insert having an external surface adjacent and extending along a portion of said internal surface circumferentially of said strap, said insert having a first end and a second end and at least one of said ends being movable along and circumferentially of said strap; and means for biasing said external surface away from said portion of said internal surface, said biasing means being integral with said insert, said insert having elongated marginal portions extending circumferentially of said strap, said biasing means comprising at least one leaf spring disposed between said internal and external surfaces and having a first end portion of one piece with one of said marginal portions, an intermediate portion reacting against said internal surface and a second end portion bearing against said external surface.

15. A hose clip comprising a substantially annular deformable strap having an internal surface; an elongated insert having an external surface adjacent and extending along a portion of said internal surface circumferentially of said strap, said insert having a first end and a second end and at least one of said ends being movable along and circumferentially of said strap; and means for biasing said external surface away from said portion of said internal surface, said biasing means being integral with said insert, said insert having elongated marginal portions extending circumferentially of said strap and said biasing means comprising a plurality of leaf springs each of one piece with one of said marginal portions and each disposed between said surfaces, said leaf springs including a first spring distant from one end of said insert and at least one additional spring between said first spring and said one end, said first spring having a first length in the circumferential direction of said strap and said at least one additional spring having a second length less than said first length.

16. A hose clip comprising a substantially annular deformable strap having an internal surface; an elongated insert having an external surface adjacent and extending along a portion of said internal surface circumferentially of said strap, said insert having a first end and a second end and at least one of said ends being movable along and circumferentially of said strap; and means for biasing said external surface away from said portion of said internal surface, said biasing means being integral with said insert, said insert having elongated marginal portions extending circumferentially of said strap, said biasing means comprising a plurality of leaf springs between said surfaces, said springs including a first spring of one piece with a first one of said marginal portions, remote from one end of said insert and extending a first distance toward the other of said marginal portions, and at least one additional spring disposed between said first spring and said one end, said additional spring being of one piece with a second one of said marginal portions and extending a lesser second distance toward the first one of said marginal portions.

* * * * *